United States Patent Office.

THOMAS GRAHAM LIEBENAU AND ALFRED G. HEANEY, OF PLAINVILLE, CONNECTICUT.

Letters Patent No. 101,891, dated April 12, 1870.

IMPROVEMENT IN ENAMEL FOR CLOCK-DIALS

The Schedule referred to in these Letters Patent and making part of the same.

*To all whom it may concern:*

Be it known that we, THOMAS GRAHAM LIEBENAU and ALFRED G. HEANEY, of Plainville, in the county of Hartford and in the State of Connecticut, have invented certain new and useful Improvements in Compositions for Coating Dials; and do hereby declare that the following is a full, clear, and exact description thereof.

Our invention has for its object the coating or enameling the faces of clock-dials; and It consists principally in the enamel used, composed of the ingredients and compounded in the manner substantially hereinafter set forth.

It also consists in the preparatory sizing, compounded of the ingredients hereinafter specified.

The base of our dials is zinc, which is prepared for the reception of the enamel by the application to or upon its surface of a coat of sizing, composed of isinglass, two ounces; parchment, two ounces; and water, one quart; which articles are mixed together and boiled until reduced in quantity to one pint, when the liquid is ready for use.

After the coat of sizing has become thoroughly dry, we cover the same with a coat of enamel, composed of soluble glass, three parts; oil of turpentine, one part; and one part each of the oxides of antimony, zinc, and arsenic, which are ground together and applied in a liquid state.

After standing from four to six hours the enamel becomes hard, and is ready for polishing.

In order to give a bluish tinge to the enamel and to render its white color more durable, we add to the above-named quantity about five grains of indigo.

The especial advantages possessed by this invention are that by its use the cost of material employed is materially reduced, a better quality of work secured, and a finished dial produced in a much shorter time than has heretofore been possible.

Having thus fully set forth the nature and merits of our invention,

What we claim as new, and desire to secure by Letters Patent, is—

The hereinbefore-described sizing, composed of isinglass and parchment, substantially as and for the purpose specified.

Also, the combination of soluble glass, oil of turpentine, and the oxides of antimony, zinc, and arsenic, or their equivalents, substantially as shown and for the purpose set forth.

In testimony that we claim the foregoing, we have hereunto set our hands this 18th day of March, 1870.

T. GRAHAM LIEBENAU.
   A. G. HEANEY.

Witnesses:
 HENRY D. STANLEY,
 B. A. STANLEY.